United States Patent [19]

Maples et al.

[11] Patent Number: 4,660,041
[45] Date of Patent: Apr. 21, 1987

[54] RADAR SCENE SIMULATOR

[75] Inventors: Vance H. Maples, Kent; George A. Eastman, Renton, both of Wash.

[73] Assignee: Boeing Aerospace Company, Seattle, Wash.

[21] Appl. No.: 534,699

[22] Filed: Sep. 22, 1983

[51] Int. Cl.⁴ .............................................. G01S 7/40
[52] U.S. Cl. ................................................. 342/170
[58] Field of Search ..................... 343/17.7; 434/1, 2; 342/169, 170

[56] References Cited

U.S. PATENT DOCUMENTS

| | | | |
|---|---|---|---|
| 2,830,290 | 4/1958 | Mercer | 434/2 X |
| 3,108,275 | 10/1963 | Chisholm | 343/18 |
| 3,208,066 | 9/1965 | Cordry | 343/17.7 |
| 3,329,953 | 7/1967 | Adams et al. | 343/17.7 |
| 3,357,014 | 12/1967 | Atlas | 343/10 |
| 3,452,353 | 6/1969 | Neuendorf | 343/17.7 |
| 3,962,671 | 6/1976 | Jilling | 340/5 C |
| 4,467,327 | 8/1984 | Drake et al. | 434/2 X |

Primary Examiner—Thomas H. Tarcza
Assistant Examiner—Mark Hellner
Attorney, Agent, or Firm—Finnegan, Henderson, Farabow, Garrett and Dunner

[57] ABSTRACT

The device includes an array of antenna systems which send to a target seeking radar scene simulation signals synchronized with target seeking signals from the target seeking radar. Each of the antenna systems receives control signals which it uses to adjust the scene simulation signals. For FM/CW target seekers, the antenna systems mix the control signals with the target seeking signals. For pulse target seekers, the antenna systems mix the control signals with an illumination signal provided from an illumination radar.

43 Claims, 8 Drawing Figures

RADAR SCENE SIMULATOR

BACKGROUND OF THE INVENTION

This invention relates to the field of scene simulators for target seekers and has special applicability to millimeter wave radar target seekers.

One purpose of radar scene simulators is to help test target seeking radars, especially those used in missiles. Due to the complexity and high cost of missiles, it has become too expensive to test-fire missiles to determine whether their target seekers are operating properly. Besides the great cost of such testing, test-firing makes it difficult to analyze a missle target seeker which failed.

Radar scene simulators were designed to test whether radars respond as designed to specific scenes. Early scene simulators used only a corner reflector situated in the radar field of view. The corner reflector reflected transmitted signals back to the target seeker and was helpful in determining only whether the target seeking radar was receiving reflections of the signals it transmitted.

Another method of testing target seeking radars uses a radar transponder in the target seeker's field-of-view which transmits to the missile signals designed to simulate the signals which would be reflected from a known target. Because such transmitting radars are not synchronized with the target seeker, a small difference in frequency between the transmitting radar and the target seeker signals could cause a correctly functioning radar to respond incorrectly.

Figure 1:
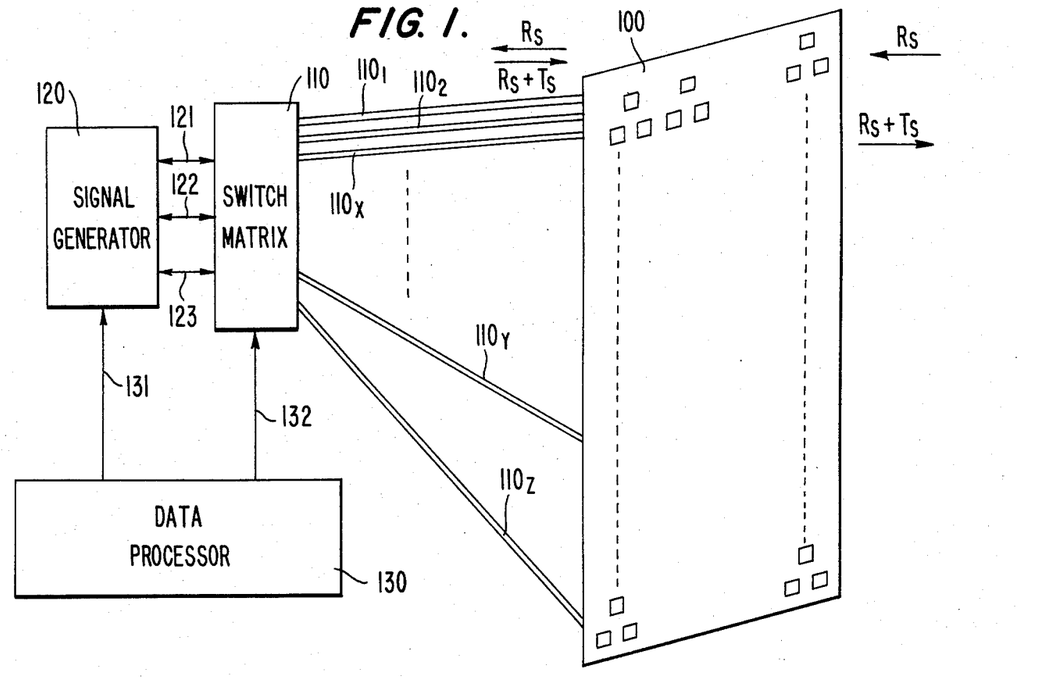
FIG. 1 depicts a system for simulating radar scenes.

FIG. 1 shows a more elaborate system for radar scene simulation. A target seeker (not shown) transmits its radar signal at frequency $f_s$ to an array 100 of RF transceiver antennae. Antenna array 100 includes a plurality of antenna triads. The use of an array of antenna triads is explained in U.S. Pat. No. 4,467,327, filed on Sept. 22, 1981 and issued on Aug. 21, 1984, which is incorporated herein by reference.

Each transceiver antenna receives the target seeker radar signal. The signals from an antenna triad are placed on whichever of lines $110_1$–$110_z$ that correspond to that triad and sent through switch matrix 110 into signal generator 120. Switch matrix 110 switches the signals from a selected antenna triad onto lines 121–123 and to signal generator 120.

Signal generator 120 forms signals to create the desired radar scenes for the target seekers by mixing the received signals, $R_S$, with target signals, $T_S$. Signal generator 120 gives this mixed signal, denoted as $R_S+T_S$, the proper amplitude and sends it to a selected antenna triad via switch matrix 110 and the lines $110_1$–$110_z$ which correspond to that triad.

Data processor 130 controls signal generator 120 to create the target signals Ts and controls switch matrix 110 to ensure the correct routing of signals.

The system in FIG. 1 is adequate for CW target seekers operating in the radio frequency range because transmission lines $110_1$–$110_z$ can be coaxial cables. For target seekers operating at millimeter wave frequencies, however, transmission lines $110_1$–$110_z$ must be mechanical waveguides. Such waveguides are bulky, difficult to maintain, and very expensive.

An object of this invention to create low cost scene simulator systems for millimeter wave target seekers.

A further object of this invention is to create scene simulators which have a great deal of flexibility and will allow complete testing of both CW and pulse target seeker radars.

Additional objects and advantages of this invention will be set forth in part in the description which follows and in part will be obvious from that description or may be learned by practice of the invention. The objects and advantages of this invention may be realized and obtained by the methods and apparatus particularly pointed out in the appended claims.

SUMMARY OF THE INVENTION

The present invention overcomes the problems of the prior art and achieves the objects listed above by antenna systems which scene simulation signals that are synchronized and phase coherent with target seeking signals transmitted by that target seeker. To test an FM/CW target seeker, the antenna systems mix control signals with the target seeking signals at the selected array antennae, and to test a pulse target seeker, the antenna systems mix at the selected array antennae range delayed intermediate frequency control signals with external illumination signals which are offset in frequency by that intermediate frequency.

To achieve the objects in accordance with the purpose of this invention, as embodied and as broadly described herein, the device of this invention for simulating radar scenes to be detected by a target seeker radar emitting target seeking signals, comprises an array of antenna systems sending to the target seeking radar scene simulation signals synchronized and coherent with the target seeking signals, each of the antenna systems including means for adjusting the scene simulation signals sent by that system, and control means connected to each of the antenna systems in the array for sending different control signals to each system thereby to control the scene simulation signals.

The method of simulating scenes of this invention for a target seeker radar emitting target seeking signals comprises the steps of: generating control signals; generating, from the control signals, scene simulation signals in synchronism with the target seeking signals; and transmitting the scene simulation signals to the target seeker.

The accompanying drawings, which are incorporated in and which constitute a part of the specification, illustrate embodiments of this invention, and, together with the description, explain the principles of the invention.

DESCRIPTION OF THE PREFERRED EMBODIMENTS

Reference will now be made in detail to presently preferred embodiments of the invention, examples of which are illustrated in the accompanying drawings. Although the inventive concept has applicability to many different types of target seekers, the specific examples shown in the accompanying drawings relate to FM/CW target seeker radars and coherent and noncoherent pulse target seeker radars.

Figure 2:
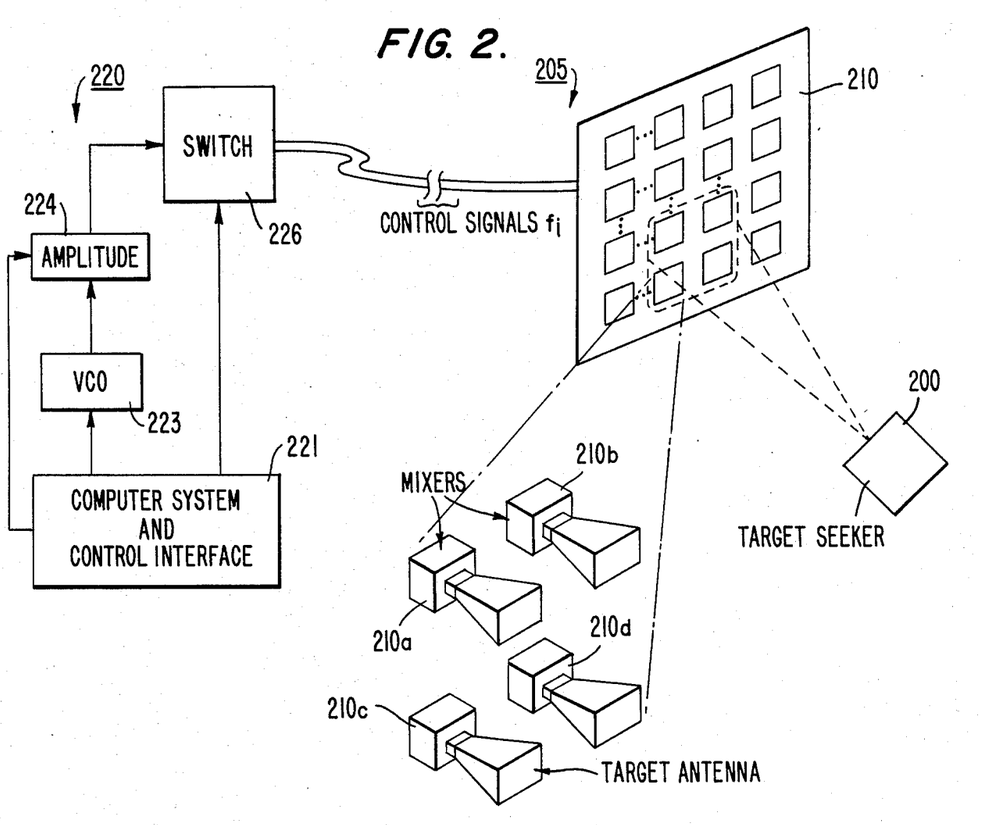
FIG. 2 illustrates an embodiment of a scene simulation of this invention for an FM/CW target seeking radar.

FIG. 2 shows an FM/CW target seeker 200 transmitting millimeter FM/CW target seeking signals to scene simulator 205. Scene simulator 205 includes antenna system array 210 and control signal generator 220. Antenna system array 210 comprises several identical antenna systems which are arranged in a matrix. The size of antenna array 210 and the arrangement of antenna systems in that array depend on the target seekers to be tested.

In FIG. 2, for example, antenna system array 210 is divided into sets of antenna system quads. One antenna system quad is shown comprising antennas $210_a$–$210_d$. The purpose of the antenna quads is similar to the purpose of the antenna triads discussed above. By sequentially energizing the antennae in an antenna system quad with signals sequencing more quickly than the scene rate of the target seeker and which bear predetermined relative weighting with each other, the antenna system quads can simulate the reflections from an object in an area defined by the boundary of the antenna system quad.

Figure 3:
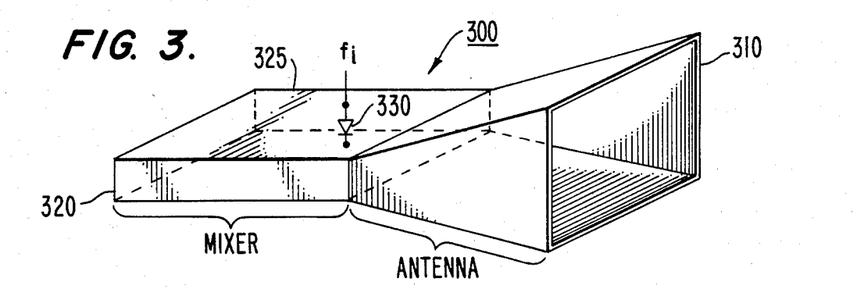
FIG. 3 shows an antenna system used in the simulator shown in FIG. 2.

An example of an antenna system which can be used in array 210 is shown in FIG. 3. Antenna system 300 comprises a millimeter wave antenna 310 capable of receiving millimeter wave target seeking signals and transmitting millimeter wave scene simulation signals.

The antenna system shown in FIG. 3, as used in this invention, *forms the scene simulation signals at the antenna system itself* and eliminates the need of routing the target-seeking signal over great distances through cumbersome waveguides.

In accordance with the present invention, antenna system 300 includes means for adjusting the scene simulation signals sent by that system. For an FM/CW target seeker, antenna system 300 includes means for mixing the target seeking signals with a different one of a plurality of control signals to form the scene simulation signals.

There are two basic mixer types which can be used with the antenna system of this invention. An example of the simpler type is shown in FIG. 3 in which double sideband mixer 320 includes a single diode 330 matched to and spanning a waveguide horn antenna 325. Mixer 320 adjusts and forms the scene simulation signals to be transmitted by antenna system 300 to the target seeker.

Diode 330 and waveguide 325 produce both a signal whose frequency is the sum of the frequencies of the control signal and the target seeking signal and another signal whose frequency is the difference between those signals' frequency (the reflected signal at the target seeking signal frequency is ignored by the target seeker). These signals appear to FM/CW target seeker 200 as two targets separated by a range equal to twice the distance between the target seeker 200 and antenna array 210.

If the additional signal from the double sideband mixer would cause interference with the primary target output, then the second mixer type, a single sideband mixer, should be used instead.

Another mixer type is the single sideband mixer which can be fabricated from two mixers interconnected by phase shift networks. The combination at the antenna system of the phase-shifted and balanced outputs from the two mixers enhances the primary target output while cancelling the second target output. To accomplish this, each mixer must provide equal amplitude conversion, and the correct phase relationships must exist.

Figure 3A:
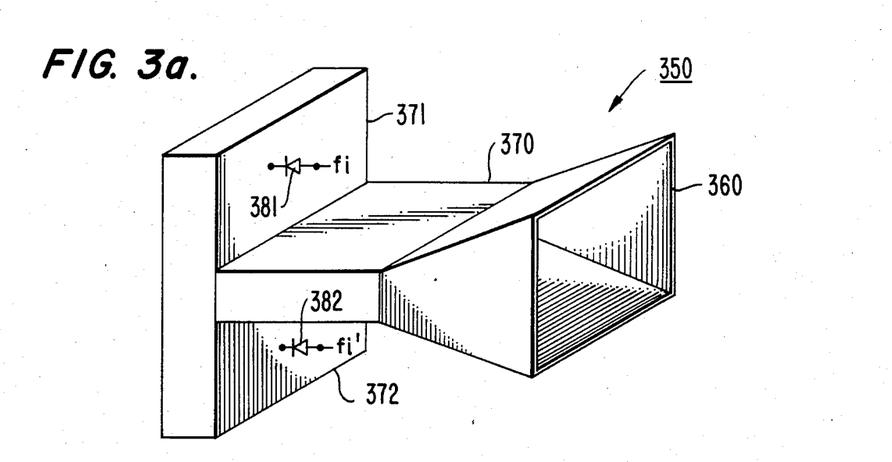
FIG. 3a shows an alternate antenna system to be used in the simulator shown in FIG. 2.

One simple example of a single sideband mixer that could be used with this invention is shown in FIG. 3a. Antenna system 350 comprises antenna 360 coupled to waveguide sections 370, 371 and 372 which are connected to form a "T." Diodes 381 and 382 span wave guide sections 371 and 372, respectively, and are spaced from the "T" junction by distances which differ by $\frac{1}{8}$ wavelength. Diodes 381 and 382 are fed with control signals fi and fi', respectively, which are 90° out of phase with respect to each other. This 90° phase shift can be accomplished by a phase shift network. The transmitted signals are mixed with the control signals in waveguide sections 371 and 372 and the resulting signals are combined in waveguide 370. The unwanted sidebands cancel and the desired sidebands add.

In accordance with the present invention, the scene simulator also includes control means connected to each of the antenna systems in the array for sending different control signals to each system.

In the embodiment shown in FIG. 2, control generator 220 sends control signals $f_i$ to the antennae in antenna system 210 to control the scene simulation signals in the manner described above.

Control signal generator 220 includes computer system and control interface 221. Once operators have entered parameters of the desired scene into computer system and control interface 221, it translates those parameters into activation signals which generate the control signals necessary to provide the desired scene.

In the embodiment shown in FIG. 2, the computer system and control interface 221 sends an activation signal to voltage controlled oscillator (VCO) 223 to set the proper frequency for the control signals. The information about range and length of the simulated scene is contained in the frequency content of the control signals.

Interface 221 sends another activation signal to amplitude control 224, which can be a conventional attenuator, to set the amplitude of the control signals generated by VCO 223. Amplitude control 224's purpose is to simulate range-related signal propagation losses, target area size and fluctuations in apparent size.

Switch 226, which is also under control of computer system and control interface 221, routes the control signals to the proper antenna systems or antenna quads in FIG. 2. Proper setting of switch 226 allows control of both the position and motion of the scene to be simulated.

The scene simulator in FIG. 2 works since the reflection signals received by an FM/CW target seeker are essentially the sum of the target seeking signal striking the antenna system plus an offset signal containing target information, e.g., size, shape, range, etc. Control signals $f_i$ in FIG. 2 are formed to match those offset signals of desired targets. When the mixers in the antenna systems sum the control signals with the target seeking signals, they then create the proper scene simulation signals.

This invention allows great flexibility because, through the control means, the scenes can be easily changed as can their position and movement. This invention also provides an efficient and low cost method for testing millimeter wave target seekers since the millimeter wave target seeking signals do not have to be transmitted back to the controller and there is no need for the expensive waveguides that would otherwise be required in systems like that in FIG. 1.

Figure 4:
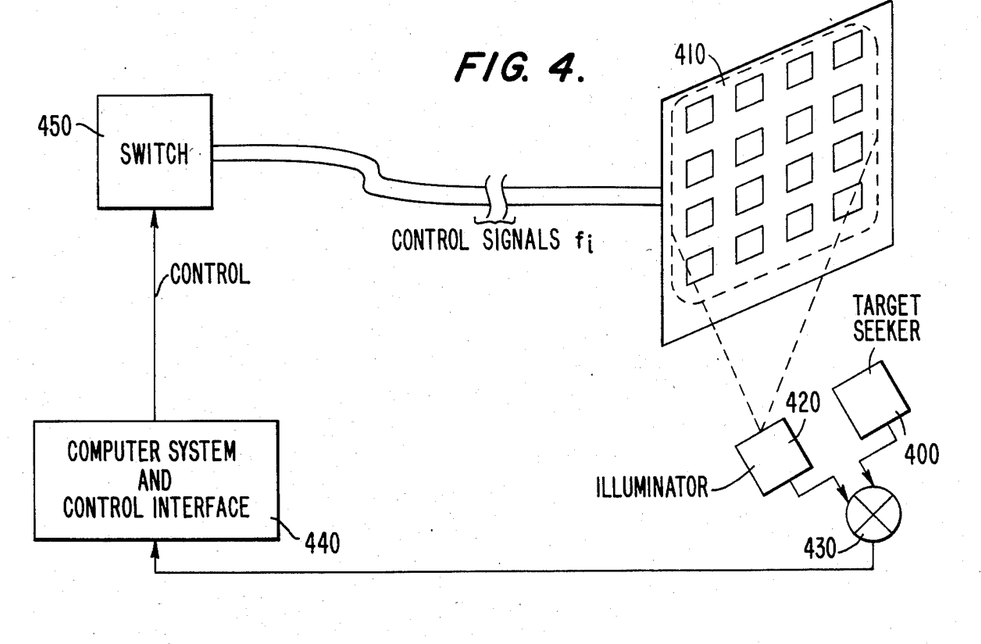
FIG. 4 shows a scene simulator according to this invention to be used with pulse target seekers.

FIG. 4 shows a scene simulator for a millimeter wave pulse target seeker. Target seeker 400 is a pulse target seeker which transmits a pulse target seeking signal at, for example, 90 GHz.

Illumination radar 420 transmits a millimeter wave illumination signal. The illumination signal covers the entire antenna array 410. For this example, the frequency of the illumination signal is 80 GHz. The reflections of the illumination signals from the array structure and surrounding areas will not interfere with the target seeker as long as the frequency of the illumination signals differs sufficiently from that of the target seeking signal.

The scene simulator of this invention when used for a pulse target seeker comprises control means coupled to the illumination radar and to the pulse target seeker radar for generating a plurality of control signals and for sending a different control signal to each antenna system. In the embodiment shown in FIG. 4, mixer 430, computer system and control interface 440, and switch 450 generate and send control signals to the antenna systems in antenna array 410.

Mixer 430 is coupled to target seeker 400 and illumination radar 420 and mixes the illumination signal and the target seeking signal to form an intermediate signal having a frequency equal to the difference of the illumination signal and the target seeking signal frequencies. The sum frequency formed by a double sideband mixer is so different from the difference frequency that the sum frequency sideband signal can be easily filtered out. For an illumination signal at 80 GHz and a target seeking signal of about 90 GHz, the intermediate signal's frequency would be about 10 GHz. The intermediate signal is sent to computer system and control interface 440.

Computer system and control interface 440 creates control signals using the intermediate signal. The control signals have approximately the same frequency as the intermediate signals. The control signals are routed to the antenna systems in antenna array 410 via switch 450. Switch 450 in FIG. 4 operates analagously to switch 226 in FIG. 2.

The antenna systems in array 410 can be similar to those shown in FIG. 3. In accordance with this invention each antenna system includes means for mixing the illumination signal with a different control signal to form the scene simulation signals transmitted to the target seeker. When the antenna systems in FIG. 3 are used in the embodiment in FIG. 4, they mix the control signal coupled to diode 330 and the illumination signal. For pulse radar seekers, the "unwanted" target from the additional signal created by the diode mixer can be positioned out of the target seeker frequency band. Alternatively, a single sideband mixer can be used.

The control signal having a frequency of 10 GHz is added to a illumination signal of approximately 80 GHz to form a scene simulation signal at approximately 90 GHz, which is the frequency of the target seeking signal and the frequency of the reflection signals which the target seeker expects to receive. The scene simulation signals are formed from the control signals which in turn are formed from the intermediate signals. Since the intermediate signals are formed from the target seeking signals, the scene simulation signals are thus coherent with the target seeking signals.

Figure 5:
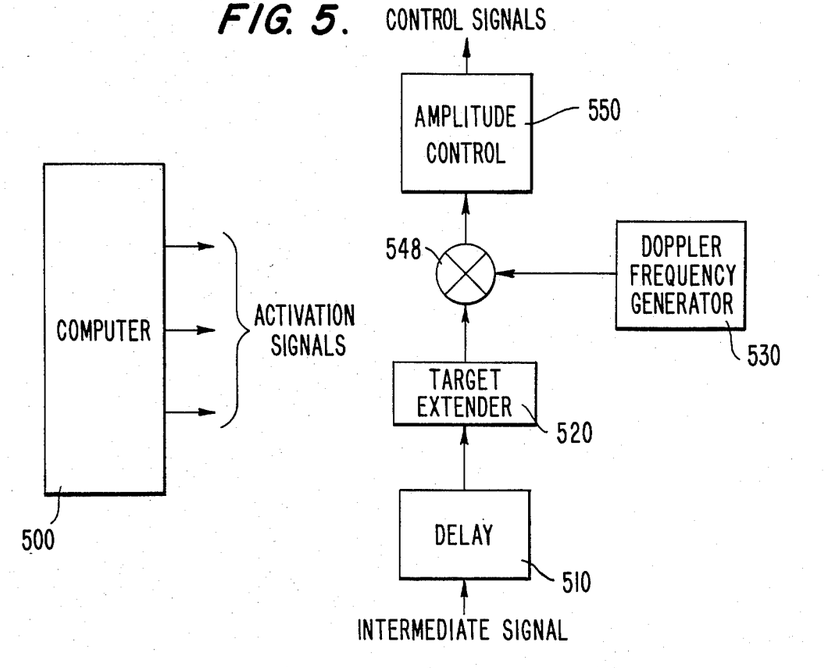
FIG. 5 shows the computer system and control interface in the simulator in FIG. 4.

FIG. 5 shows computer system and control interface 440 in greater detail to illustrate how the intermediate signal is used to form the control signals in this embodiment.

Gate 510 is a variable delay line which delays the intermediate signal a predetermined amount to reflect the intended range of the scene to be simulated.

Target extender line 520 is connected to the output of variable delay line 520 in FIG. 5 and widens the pulses of the intermediate signal to adjust the lengths of the targets. This line can include of several tap delay lines whose outputs are combined.

To simulate target movement, mixer 540 mixes the output of target extender 520 with a doppler signal generated by doppler frequency generator 530. Preferably, mixer 540 is a single sideband mixer which can be adjusted to add (or subtract) the frequency generated by doppler frequency generator 530 to the intermediate signal.

The output of mixer 540 feeds amplitude control 550 which sets the proper amplitude of the control signals. In FIG. 5, amplitude control 550 is a standard attenuator.

Computer 500 contains the parameters of the scene desired to be simulated and translates those parameters into activation signals. Elements 510-550 are all under the control of activation signals from computer 500.

The scene simulator in FIG. 4 can also be configured to add a second scene or to add background clutter. For such a configuration, computer system and control interface 440 comprises computer 500 and another set of elements similar to those elements 510-550. One set of elements creates the primary control signals and an identical set of elements generates background control signals. Both the background control signals and the primary control signals are switched to antenna array 410 through switch 450 and combined with the illumination signal at the antenna systems in array 410 to form the scene simulation signals.

There are two principal ways of combining the primary and background control signals. One is to time division multiplex the control signals to the antenna system at a rate much greater than the target seeker senses. The target seeker then combines the different signals into one "scene." An alternative way of combining the signals is to add them in a transmission line combiner.

Figure 6:
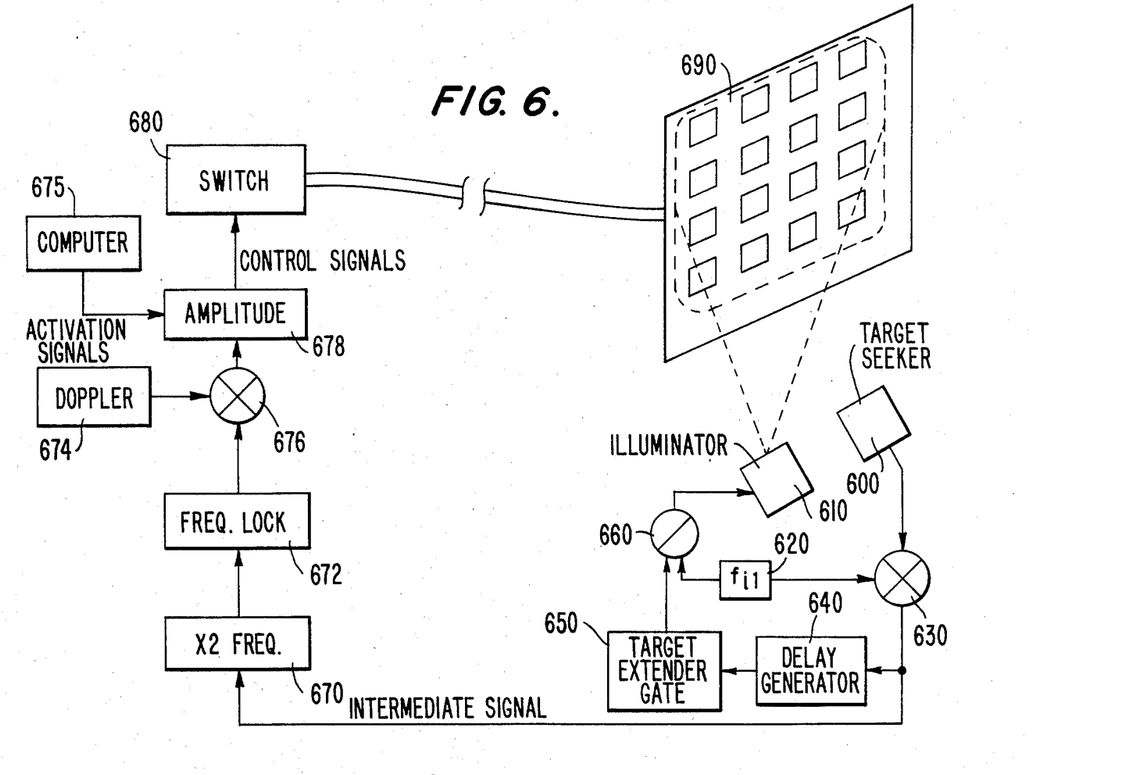
FIG. 6 shows an alternate embodiment of a scene simulator of this invention for use with pulse target seekers.

FIG. 6 shows a slightly different embodiment of this invention of a scene simulator for a pulse millimeter wave target seeker 600.

Signal generator 620 generates a signal $f_{il}$ which feeds mixer 630 along with the target-seeking signal from target seeker 600. The output of mixer 630 is an intermediate signal which feeds delay generator 640. Delay generator 640 delays the intermediate signal by an amount appropriate for imparting the desired range of the scene.

The output of delay generator 640 feeds target extender gate 650 whose output is connected to mixer 660 (single or double sideband) along with the illumination signal $f_{il}$. Target extender gate 650 controls the pulse width of the intermediate signal.

Mixer 660 mixes $f_{il}$ and the output of range extent 650 to form a signal which illumination radar 610 broadcasts to antenna array 690 as the illumination signal.

For example, if the target seeker seeking signal is 94 GHz and $f_{il}$ is 90 GHz, then the intermediate signal is 4 GHz. That 4 GHz intermediate signal, after passing through delay generator 640 and range gate 650, is then subtracted from the 90 GHz $f_{il}$ by single sideband mixer 660 to form an 86 GHz signal which then feeds illumination radar 610.

The intermediate signal is also sent through frequency doubler 670 to compensate for the fact that, after passing through mixers 630 and 660, the illumination signal now differs from the target seeking signal by an amount equal to twice the intermediate signal. Frequency doubler 670 can be, for example, a nonlinear element that produces harmonics of the intermediate signal and a filter tuned to the intermediate signal's second harmonic.

The output of frequency doubler 670 is frequency locked by element 672 which can be a standard phase or frequency lock circuit.

Doppler shift and amplitude control is added by elements 674, 676 and 678 in the manner described above. The control signals appear at the output of amplitude control 678 and are switched to an antenna array 690 via switch 680 in the manner previously described. Elements 670–680 operate under the control of computer 675 by activation signals.

The operation of the radar scene simulator in FIG. 6 differs from the radar scene simulator in FIG. 4 in part because delay and target length information is provided by th illumination signal. Antenna array 690 provides an active scene simulation signal at the proper frequency only when the illumination signal is received by the antenna systems in array 690.

Figure 7:
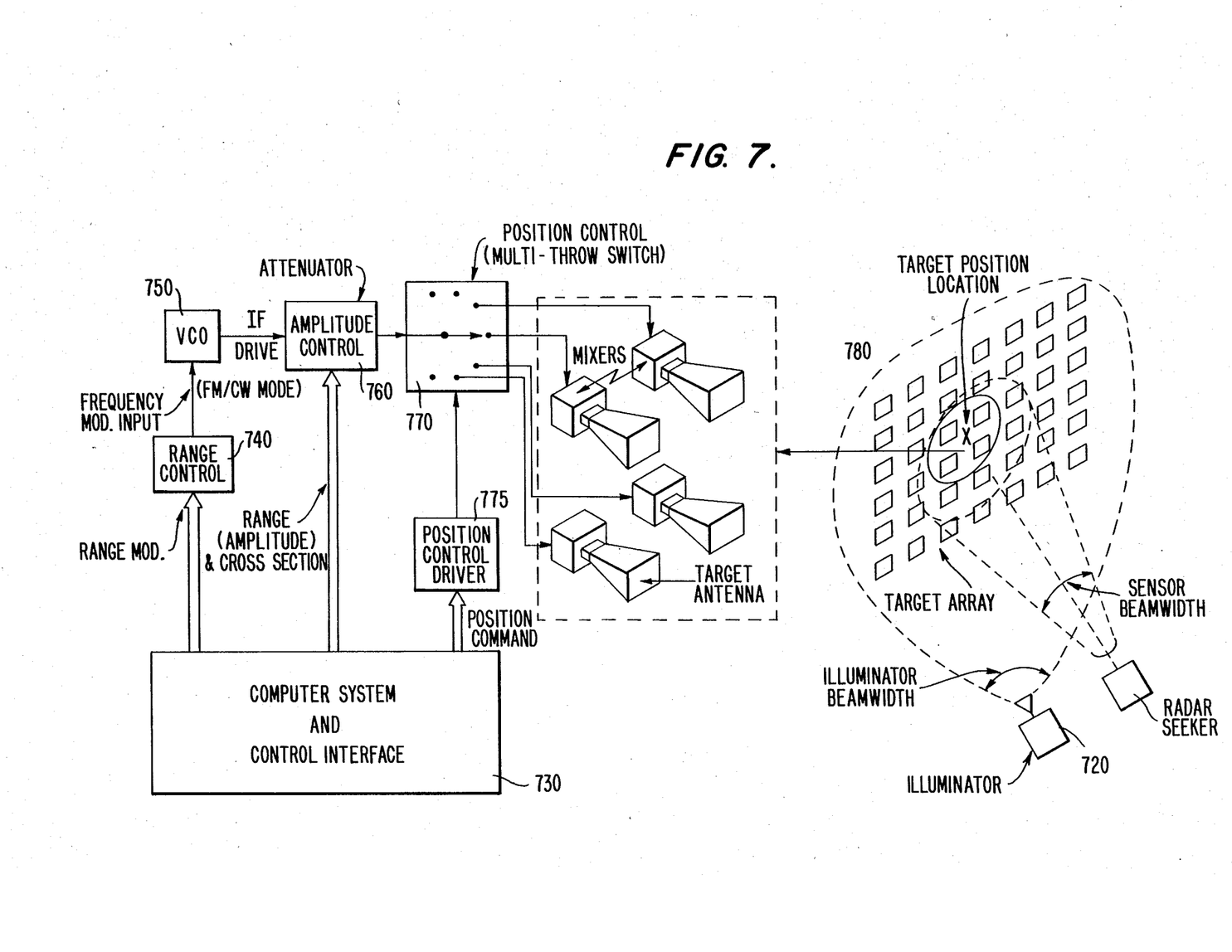
FIG. 7 shows a scene simulator of the present invention which can be used for FM/CW and pulse target seekers.

FIG. 7 shows a scene simulator that can test both FM/CW target seeking radars and pulse target seeking radars. The functions of target seeking radar 710, the illumination radar 720, mixer 725, array 780 are as described above with regard to FIGS. 2–4.

Computer system and control interface 730 controls elements 740–775 to simulate the desired scene in the manner explained in the discussion accompanying FIGS. 2, 4 and 5 above. Briefly, range control 740 imparts delay and target length information. VCO 750 operates in a manner similar to VCO 530 to control the target doppler.

Amplitude control 760, which is an attenuator in FIG. 7, adjusts the amplitude of the control signal from VCO 750 and feeds that control signal to multi-throw switch 770 for transfer to antenna array 780. Multi-throw switch 770 is controlled by computer system control interface 730 via position control driver 775 which translates position commands into control signals for different switch positions.

It will be apparent to those skilled in the art that modifications and variations can be made in the radar signal processing methods and apparatus of this invention. For example, use of the invention need not be limited to millimeter wave target seekers. The invention in its broader aspects is not limited to the specific details, representative methods and apparatus, and illustrated examples shown and described. Departure may be made from such details without departing from the spirit or scope of the general inventive concept.

What is claimed is:

1. A device for simulating radar scenes to be detected by an FM/CM target seeker radar emitting target seeking signals, said deivce comprising:
   (a) an array of antenna systems sending to said target seeking radar scene simulation signals synchronized with said target seeking signals, each of said antenna systems including means for adjusting the scene simulation signals sent by that system and each of said adjusting means including means for mixing said target seeking signals with at least one of a plurality of control signals to form said scene simulation signals; and
   (b) control means connected to each of said antenna systems in said array for sending said plurality of control signals to each antenna system.

2. The device in claim 1 wherein each of said adjusting means includes means for changing the frequency of said scene simulation signals.

3. The device in claim 1 wherein each of said adjusting means includes means for adjusting the amplitude of scene simulation signals.

4. The device in claim 1 wherein said control means includes a data processor.

5. A device for simulating radar scenes to be detected by a millimeter wave FM/CW target seeker radar comprising:
   (a) an array of antenna systems each receiving millimeter wave target-seeking signals from said FM/CW target seeker radar and transmitting millimeter wave scene simulation signals to said FM/CW radar, and each including means for mixing said target seeking signals with a different one of a plurality of control signals to form said scene simulation signals; and
   (b) control means coupled to each of said antenna systems for generating and sending to each of said antenna systems a different one of a plurality of control signals thereby to control said scene simulation signals to simulate a scene for said FM/CW targe seeker radar.

6. The device in claim 5 wherein said mixing means in each of said antenna systems includes a wave guide and a diode connected across said wave guide and coupled to the control signal sent to that antenna system.

7. The device of claim 5 wherein said mixing means in each of said antenna systems includes a single sideband mixer.

8. The device of claim 5 wherein said control means includes means for adjusting the frequency of each of said control signals.

9. The device of claim 5 wherein said control means includes means for adjusting the amplitude of each of said control signals.

10. The device in claim 5 wherein said control means includes means for switching said control signals to said antenna systems.

11. The device in claim 5 wherein said array of antenna systems is arranged into sets of multiple antenna systems.

12. A method for simulating dynamic radar scenes to be detected by a millimeter wave FM/CW target seeker radar comprising the steps of:
   (a) receiving millimeter wave target seeking signals from said target seeker radar;
   (b) selecting a dynamic radar scene to be simulated including the sizes, locations and movement of simulated targets in said selected radar scene and generating control signals for reproducing said selected radar scene;

(c) mixing said millimeter wave target seeking signals and said control signals to form scene simulation signals; and (d) transmitting said scene simulation signals to said FM/CW target seeker radar to simulate said selected radar scene including said sizes, locations, and movement of said simulated targets in said selected radar scene.

13. The method in claim 12 wherein the step of selecting and generating said control signals includes the step of adjusting the frequency of said control signals.

14. The method in claim 12 wherein the step of selecting and generating said control signals includes the step of adjusting the amplitude of said control signals.

15. A device for simulating radar scenes to be detected by a millimeter wave pulse target seeker radar, said device comprising:

(a) an illumination radar transmitting a millimeter wave illumination signal;

(b) an array of antenna systems each receiving said illumination signal and transmitting millimeter wave scene stimulation signals to said pulse target seeker radar, and each said antenna system including means for mixing said illumination signal with a different one of a plurality control signals to form said scene simulation signals; and (c) control means coupled to said illumination radar, to said pulse target seeker radar, and to said antenna systems for generating and sending to each of said antenna systems a different one of a plurality of control signals.

16. The device in claim 15 wherein said control means includes means for mixing said signals from said illumination radar and said pulse target seeker radar to form an intermediate signal used to form said control signals.

17. The device in claim 16 wherein said control means includes means coupled to said intermediate signal to delay said intermediate signal a predetermined amount of time.

18. The device in claim 16 including means coupled to said intermediate signal to control the width of the intermediate signal.

19. The device of claim 16 including doppler mixing means coupled to said intermediate signal.

20. The device of claim 16 including means coupled to said intermediate signal to adjust the amplitude of said control signals.

21. The device in claim 16 including means for switching said control signals to said antenna systems.

22. The device of claim 15 wherein said mixing means in each of said antenna systems includes a wave guide and a diode connected across said wave guide and to said control signal sent to that antenna system.

23. The device of claim 15 wherein said mixing means in each of said antenna systems includes a single sideband mixer.

24. The device of claim 15 further including background control means for creating background control signals, each said background control signal being coupled to a different one of said antenna systems, and wherein each of said antenna systems include means for mixing the control signal sent to it with the background control signal sent to it and with said illumination signal to form said scene simulation signals.

25. A device for simulating scenes to be detected by a millimeter wave pulse radar transmitting a target seeking signal at a first frequency, said device comprising:

(a) an illumination radar transmitting a millimeter wave illumination signal at a second frequency;

(b) an array of antenna systems each receiving said illumination signal and transmitting millimeter wave scene simulation signals to said pulse radar, and each said antenna system including means for mixing said illumination signal with a different one of a plurality of control signals to form said scene simulation signals; and (c) control means for generating an intermediate signal having a frequency approximately equal to the difference between said first and second frequencies and for creating said plurality of control signals from said intermediate signal.

26. The device in claim 25 wherein said control means includes means for delaying said intermediate signal a predetermined period to form said control signals.

27. The device of claim 25 wherein said control means includes means for altering the width of said intermediate signal to form said control signals.

28. The device in claim 25 wherein said control means includes means for altering the frequency of said intermediate signal to form said control signals.

29. The device in claim 25 wherein said control means includes means for altering the amplitude of said control signals.

30. The device in claim 25 wherein said control means includes:

(a) a delay circuit coupled to said intermediate signal;

(b) target extent circuitry, connected to said delay circuit, for altering the width of said intermediate signal;

(c) a doppler frequency generator for generating an offset signal at a frequency representing the speed of the scene to be simulated;

(d) a mixer with inputs coupled to said target extent circuitry and to said doppler frequency generator;

(e) an attenuator having an input coupled to said mixer;

(f) a switch whose inputs are coupled to said attenuator and whose outputs are coupled to said antenna systems; and (g) a computer coupled to said control means for creating said plurality of control signals.

31. The device in claim 29 wherein said control means includes a mixer coupled to said illumination radar and to said pulse radar for forming said intermediate signal.

32. A method of simulating dynamic scenes for a target seeker radar emitting target seeking signals, said method comprising the steps of:

(a) selecting a dynamic radar scene to be simulated including the sizes, locations, and movement of simulated targets in said selected radar scene and generating control signals for reproducing said selected radar scene;

(b) generating, from said control signals, scene simulation signals in synchronism with said target seeking signals by mixing said target seeking signals and said control signals; and (c) transmitting said scene simulation signals to said target seeker radar to simulate said selected dynamic radar scene including said size, locations, and movement of said simulated targets.

33. The method of claim 32 wherein said step of selecting and generating control signals includes a step of adjusting the frequency of said control signals.

34. The method of claim 32 wherein the step of selecting and generating said control signals includes a step of adjusting the amplitude of said control signals.

35. A method of simulating dynamic scenes for a millimeter wave pulse target seeker radar emitting target seeking signals, said method comprising the steps of:
- (a) generating and transmitting illumination signals;
- (b) selecting a dynamic radar scene to be simulated including the sizes, locations, and movement of simulated targets in said selected radar scene and generating control signals for reproducing said selected radar scene;
- (c) mixing said illumination signals and said control signals to form scene simulation signals; and
- (d) transmitting said scene simulation signals to said pulse target seeker radar to simulate said selected radar scene including said sizes, locations and movement of said simulated targets in said selected radar scene.

36. The method of claim 35 wherein said step of selectng and generating control signals includes a step of delaying said intermediate signals for a predetermined period of time.

37. The method of claim 36 wherein said step of selecting and generating control signals includes a step of altering the width of said intermediate signals.

38. The method of claim 36 wherein the step of selecting and generating said control signals includes a step of mixing said intermediate signal with an offset frequency signal.

39. The method of claim 36 wherein the step of selecting and generating said control signals includes a step of altering the amplitude of said control signals.

40. A device for simulating scenes to be detected by a millimeter wave pulse target seeker, said device comprising:
- (a) means for generating a first signal;
- (b) means for mixing said first signal with said target seeking signals;
- (c) means connected to said first mixing means for delaying the output of said first mixing means;
- (d) means connected to said delaying means for adjusting the width of pulses in the output of said delaying means;
- (e) second mixing means connected to said pulse width adjusting means and said first signal generating means for creating an illumination signal;
- (f) an illumination radar transmitting said illumination signal;
- (g) a frequency doubler coupled to said first mixing means;
- (h) a frequency lock coupled to said frequency doubler and outputting a plurality of control signals;
- (i) an array of antenna systems each receiving said illumination signal and transmitting millimeter wave scene simulation signals to said pulse target seeker radar, and each said antenna systems including means for mixing said illumination signal with a different one of said plurality of control signals to form said scenes simulation signal; and
- (j) a switch coupled to said frequency lock to switch said control signals to selected ones of said antenna systems in said array.

41. A device for simulating radar scene to be detected by a pulse target seeker radar emitting target seeking signals, said device comprising:
- (a) an illumnination radar transmitting an signal;
- (b) an array of antenna systems sending to said target seeking radar scene simulation signals synchronized with said target seeking signals, each of said antenna systems including means for adjusting the scene simulation signals sent by that system, and !each of said adjusting means including means for mixing said illumination signal with at least one of a plurality of control signals to form said scene simulation signals; and control means connected to each of said antenna systems in said aray and to said illumination radar for sending said plurality of control signals to each said antenna system.

42. A method of simulating dynamic scenes for a target seeker radar emitting targets seeking signals, said method comprising the steps of:
- (a) selecting a dynamic radar scene to be simulated including the sizes, locations, and movement of simulated targets in said selected radar scene and generating control signals for reproducing said selected radar scene;
- (b) transmitting illumination signals from an illumination radar;
- (c) generating, from said control signals and said illumination signals, scene simulation signals, in synchronism with said target seeking signals by mixing said control signals and said illumination signals to simulate said selected dynamic radar scene including said sizes, locations, and movement of said simulated targets; and
- (d) transmitting said scene simulation signals to said target seeking radar.

43. a method of simulating dynamic scenes for millimeter wave pulse target seeker radar emitting target seeking signals, said method comprising the steps of:
- (a) generating and transmitting illumination signals;
- (b) mixing said illumination signals and said target seeking signals to form an intermediate signal;
- (c) selecting a dynamic radar scene to be simulated including the sizes, locations and movement of simulated targets in said selected radar scene and generating control signals from said intermediate signals; for reproducing said selected radar scene;
- (d) mixing said illumination signals and said control signals to form scene simulation signals to simulate said selected dynamic radar scene including said sizes, locations, and movement of said simulated targets; and
- (e) transmitting said scene simulation signals to said pulse target seeking radar to simulate a scene.

* * * * *